A. Albertson,

Bottle Stopper.

No. 2,386. Reissued Oct. 30, 1866.

Witnesses:

J. L. Law

Howard Bird

Inventor:

Albert Albertson

UNITED STATES PATENT OFFICE.

JOHN MATTHEWS, OF NEW YORK, N. Y., ASSIGNEE OF ALBERT ALBERTSON.

IMPROVEMENT IN BOTTLE-STOPPERS.

Specification forming part of Letters Patent No. 36,266, dated August 26, 1862; Reissue No. 2,386, dated October 30, 1866.

*To all whom it may concern:*

Be it known that ALBERT ALBERTSON, of the city, county, and State of New York, obtained Letters Patent of the United States, dated August 26, 1862, and numbered 36,266, for an Improved Bottle-Stopper, which Letters Patent have been, by an assignment dated and duly recorded in the Patent Office, assigned to JOHN MATTHEWS, of the city, county, and State of New York; and I, the said JOHN MATTHEWS, do hereby declare that the following is a full, clear, and exact description thereof, reference being had to the accompanying drawings and to the letters of reference marked thereon, making a part of this specification.

This invention consists of a stopper which always remains in the bottle, and which readily permits the introduction of any fluid into the bottle, and at the same time effectually prevents any discharge of it except when desired, and which is particularly adapted to bottles containing soda-water, wines, and all fluids having or generating fixed air, as the greater the pressure from such cause the closer and tighter is the stopper. An important feature of the invention, which distinguishes it from all previously-applied stoppers which remain in the bottle, is that it is inserted into the bottle through the neck without requiring the use of a separate or larger opening or detachable cap to permit its introduction.

To enable others skilled in the art to apply my invention to use, I will proceed to describe it with reference to the drawings.

Figure 1:
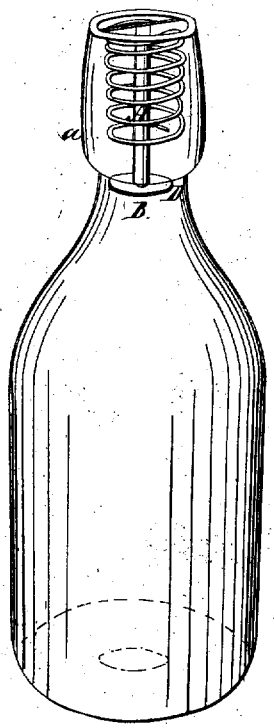
Figure 3:
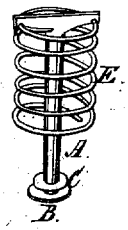
Figure 2:
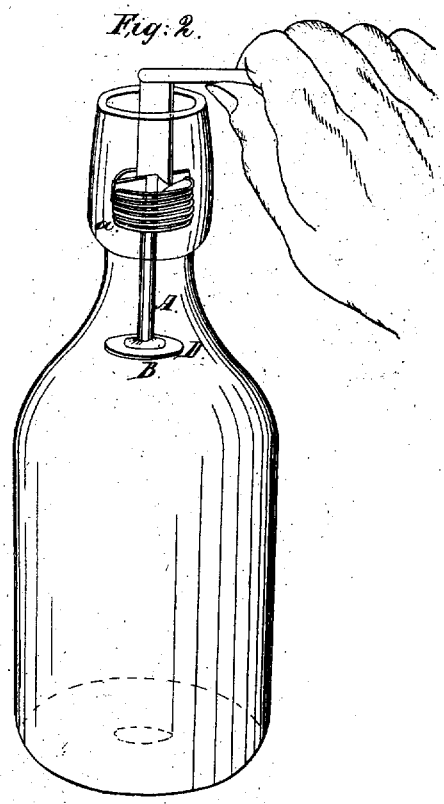
Figure 4:
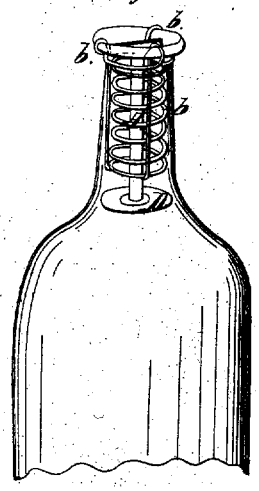

Figure 1 is a perspective view of the bottle with the stopper in position for closing the mouth. Fig. 2 is a similar view of the bottle with the stopper pressed down, as when any fluid is to be poured out. Fig. 3 is a perspective view of the stopper detached. Fig. 4 is a perspective view of a modification of the mode of supporting the spring which holds up the stopper.

Similar letters of reference indicate corresponding parts in the several figures.

The stopper represented is of a form and construction which is well adapted for practical use. It consists of a small metallic or other stem, A, upon the lower end of which is fixed a rigid button or disk, B, which is made of such a size as just to pass through the smallest part of the mouth or neck of the bottle. Close above this button or disk is secured to the stem A a smaller rigid ring or disk, C. Between these two disks is placed and held fast a disk or diaphragm of india rubber, felt, leather, or cloth, D, or any yielding substance, which should be somewhat larger in its external diameter than the disk B—say, generally, of a diameter about as large again—and larger than the lower part of the interior of the neck of the bottle. To a stop or shoulder on the upper part of the stem, A, which is long enough to project above the mouth of the bottle or vessel when the valve is in contact with its seat, there is attached or applied a helical wire spring, E, which covers the stem A for some little distance, and which need only be stiff enough to hold up firmly the stem A and cause the rubber or other diaphragm D to fit closely against the inside neck of the bottle. Different methods may be devised for supporting the spring E, of which two are shown in the drawings.

Figs. 1 and 2 show the inside of the mouth or neck of the bottle, made somewhat larger or ground out as far as the bottom of the spring, or about the point *a*, so as to furnish a little edge or shoulder sufficient to support the spring. This is the neatest arrangement, and one most likely to be made use of when new bottles are to be made. As the only end to be secured by means of the shoulder *a*, or increasing the size of the upper part of the neck of the bottle, is to furnish a support for the spring E, any other device for giving such support will secure the same end.

Fig. 4 shows a method of applying the stopper to the ordinary bottles without grinding out the inside of the neck. Two or three metallic strips, *b b b*, are clasped over the top of the bottle-neck, and extend down within the neck as far as it may be necessary to have the spring E reach. The bottoms of these pieces *b b b* are turned over or around the lower coil of the spring, and thus give it a sufficient support or bearing.

The stopper is placed in the bottle by simply inserting it in the neck and pressing the spring E until the rubber or flexible disk or diaphragm D has passed below the narrowest part or place *a* of the neck. As the ring or disk C is considerably smaller than the disk B, the flexible disk or diaphragm D will fold up around C as the stem A is passed down through the neck, and the stopper will thus easily pass into the bottle. But when once the stopper has been so placed in the bottle, as the disk B is of nearly the size of the opening in the neck, any effort of the spring E, or of any kind, to draw or push up the standard A presses the flexible disk D between the bottle and the bottom B, and effectually prevents its coming out; and the greater the pressure from within against the bottom of the stopper the closer will the contact be of the parts B and D against the sides of the bottle.

When it is desired to open the bottle to discharge its contents, a bent instrument, such as shown in Fig. 2, or any one fitted to accomplish the same purpose, pressing down the stopper, may be made use of.

The disk or diaphragm D may be made of a variety of substances, and may be made of different forms, and still act upon the same principle or law of action. Such part can, if desired, be in the form of a cork, and may be of cork, as large as can be driven through the neck of the bottle and still be held in its proper position by means of the spring E.

I am aware that an internal flap, valve, or door acted upon by a spring, float, or counterweight has been used to close the orifice of vessels, as an ink-holder or oil-vessel, to keep out dust, &c., but intended to give way on a very slight pressure. Such arrangement, however, could not make a stopper which would be air-tight, or which would keep or protect from evaporization, &c., any fluids that might be put in any such vessels; and, moreover, as heretofore constructed, has required for its introduction either a separate opening or an opening larger than the mouth of the vessel and a removable cap. An important characteristic of the invention is that the valve has or may have its seat on the substance or piece of which the body of the bottle or vessel is composed.

I do not therefore claim, generally, closing a bottle or vessel by an internal valve, and whether such valve closes the bottle tightly or not; but—

What I claim, and desire to secure by Letters Patent, is—

1. A stopper which is inserted through the mouth of a bottle or other vessel, and which, when inserted, is closed perfectly tight against a seat formed within the bottle itself by pressure in an upward direction.

2. A prolongation of such stopper by means of a central stem, rod, or other extension of the stopper in an outward direction beyond the seat of the valve, for the purpose of affording facility for opening the stopper, or that of receiving the upward pressure of a spring or other means of drawing the valve to its seat, substantially as herein specified.

3. The two disks B C, of unequal size, and the interposed flexible disk or diaphragm D, in combination with each other and with a stem or standard, A, substantially as herein specified.

JOHN MATTHEWS.

Witnesses:
A. LeClerc,
I. W. Coombs.